US009182224B2

(12) United States Patent
Lokshyn

(10) Patent No.: US 9,182,224 B2
(45) Date of Patent: Nov. 10, 2015

(54) APPARATUS FOR MEASURING AND ADJUSTING PARAMETERS OF THE GEOMETRY OF THE WHEELED VEHICLE CHASSIS

(76) Inventor: Mykhaylo Lokshyn, Haifa (IL)

( * ) Notice: Subject to any disclaimer, the term of this patent is extended or adjusted under 35 U.S.C. 154(b) by 265 days.

(21) Appl. No.: 13/985,981

(22) PCT Filed: Feb. 6, 2012

(86) PCT No.: PCT/IL2012/000062
§ 371 (c)(1),
(2), (4) Date: Aug. 16, 2013

(87) PCT Pub. No.: WO2012/110998
PCT Pub. Date: Aug. 23, 2012

(65) Prior Publication Data
US 2013/0318803 A1    Dec. 5, 2013

(30) Foreign Application Priority Data

Feb. 17, 2011  (IL) .......................................... 21 1271

(51) Int. Cl.
*G01B 11/26* (2006.01)
*G01B 11/275* (2006.01)
(52) U.S. Cl.
CPC ............ *G01B 11/26* (2013.01); *G01B 11/2755* (2013.01); *G01B 2210/28* (2013.01); *G01B 2210/30* (2013.01)
(58) Field of Classification Search
CPC ............ G01B 11/26; G01B 7/00; G01C 9/00; G01C 9/02
USPC ........................ 33/288, 203, 203.15, 370, 371
See application file for complete search history.

(56) References Cited

U.S. PATENT DOCUMENTS

| | | | |
|---|---|---|---|
| 3,417,479 A | | 12/1968 | Hirmann |
| 3,889,527 A | * | 6/1975 | Wallace ...................... 73/117.02 |
| 3,891,311 A | | 6/1975 | Fletcher et al. |
| 4,363,175 A | | 12/1982 | Hedahl |
| 4,893,413 A | * | 1/1990 | Merrill et al. ................... 33/371 |
| 5,105,546 A | * | 4/1992 | Weise et al. ................ 33/203.12 |
| 5,919,238 A | * | 7/1999 | Lavey .......................... 701/34.4 |
| 6,076,269 A | * | 6/2000 | Sekino et al. ................... 33/371 |
| 6,772,524 B2 | | 8/2004 | Machek |
| D513,963 S | * | 1/2006 | Cuddy .......................... D8/339 |
| 7,152,333 B1 | * | 12/2006 | Chou ......................... 33/203.18 |
| 8,825,211 B2 | * | 9/2014 | Park .............................. 700/259 |
| 8,844,147 B2 | * | 9/2014 | Wilds et al. ..................... 33/301 |
| 2004/0107591 A1 | * | 6/2004 | Cuddy ............................ 33/370 |
| 2013/0318803 A1 | * | 12/2013 | Lokshyn ......................... 33/288 |

FOREIGN PATENT DOCUMENTS

IL    184004    12/2009

OTHER PUBLICATIONS

International Search Report of Corresponding PCT Application No. PCT/IL2012/000062, filed Feb. 5, 2012, Published as Publication No. WO 2012/110998, Dated Aug. 23, 2012.

* cited by examiner

*Primary Examiner* — Yaritza Guadalupe-McCall
(74) *Attorney, Agent, or Firm* — William H. Dippert; Lerner Greenberg Stemer LLP

(57) ABSTRACT

The present invention relates to a measuring apparatus, and more particularly to an apparatus used during testing of the steering characteristics of a wheeled motor vehicle and can be used for measuring and adjusting the chassis geometry parameters including toe-in/toe-out, camber, caster, steering angles and plays, and the like. The apparatus designed to be mounted within the interwheel space on the wheel disk and comprising a removable support designed to be mounted on the inner side of the wheel disk.

14 Claims, 8 Drawing Sheets

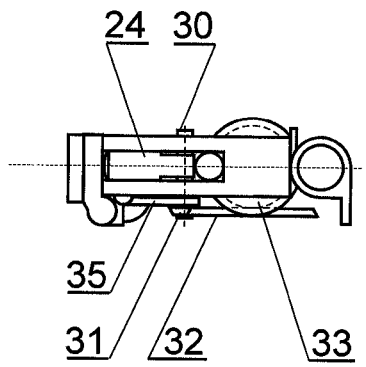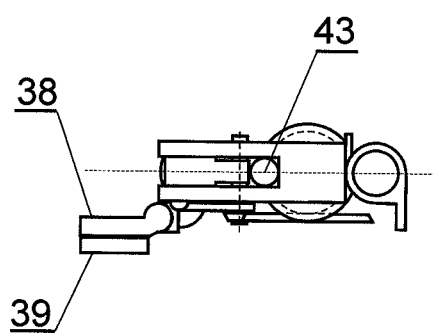
*Fig. 9*  *Fig. 10*
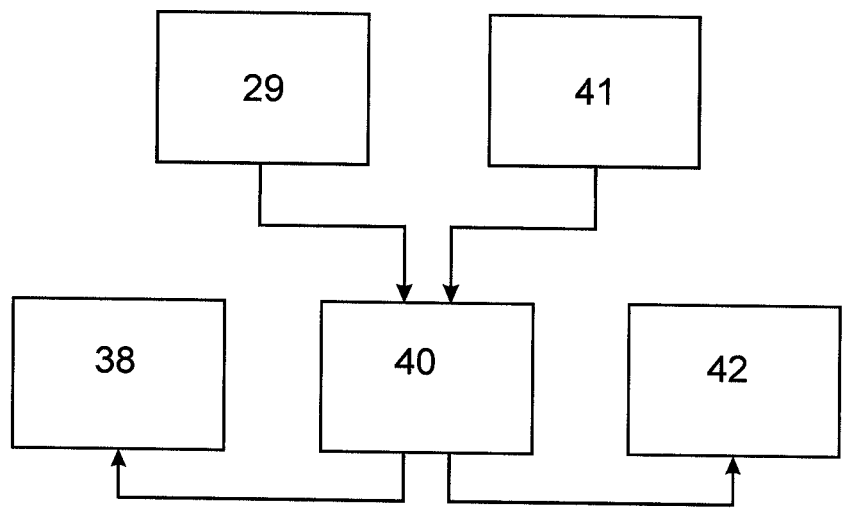
*Fig. 11*

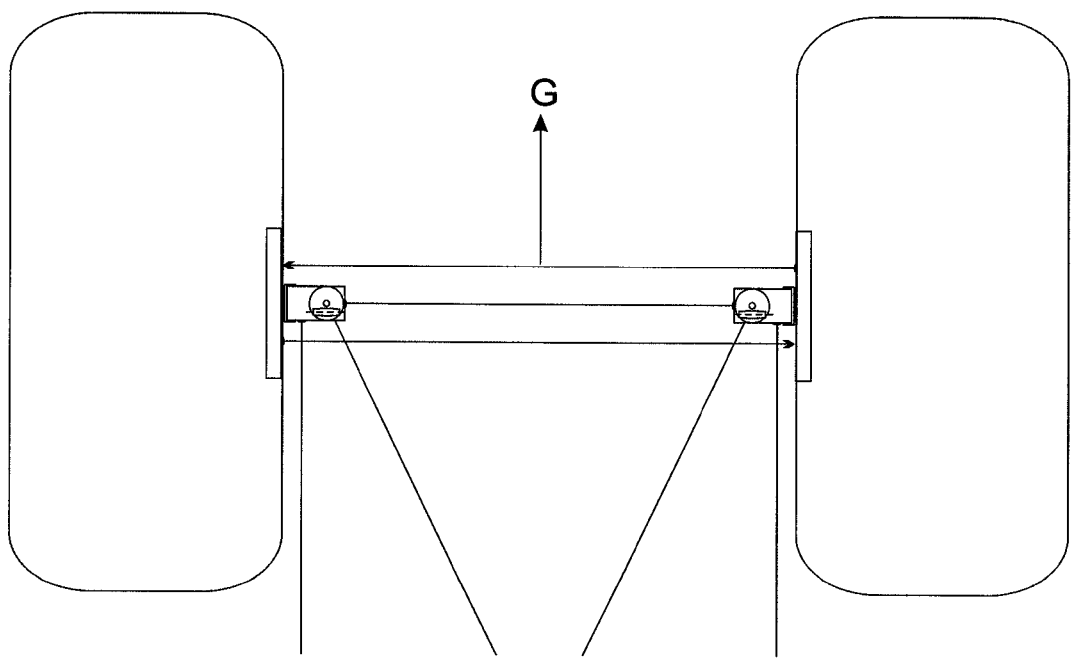
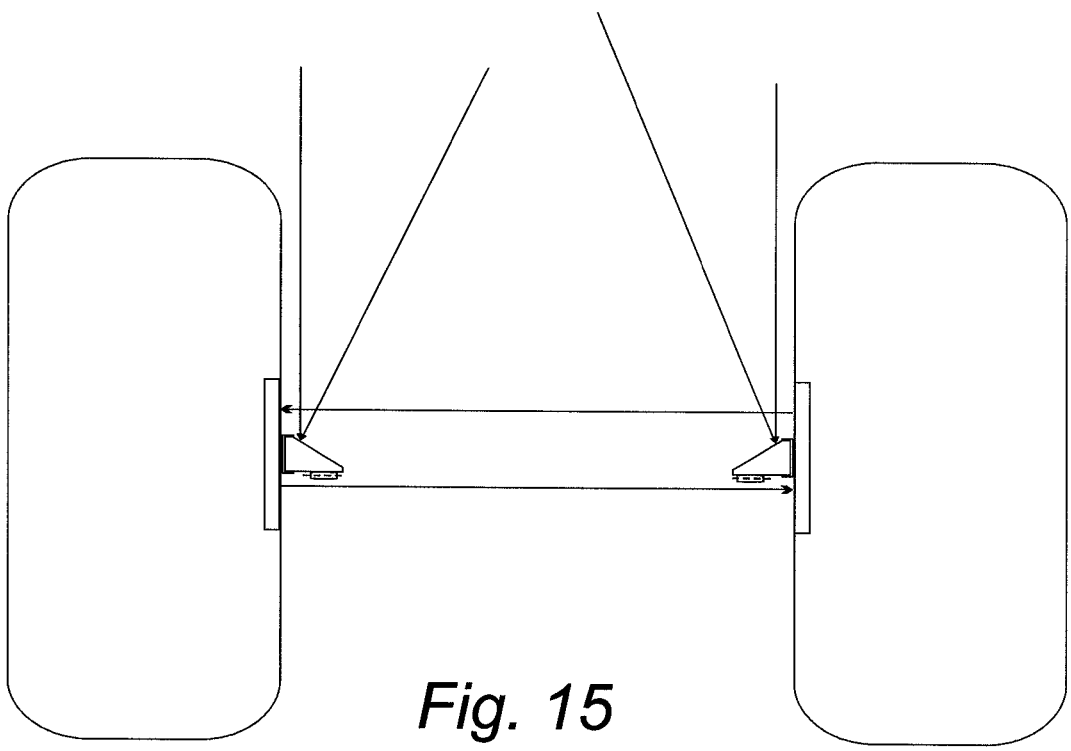
*Fig. 15*

APPARATUS FOR MEASURING AND ADJUSTING PARAMETERS OF THE GEOMETRY OF THE WHEELED VEHICLE CHASSIS

FIELD of TECHNICAL APPLICATION

The present invention relates to a measuring apparatus, and more particularly to an apparatus used during testing of the steering characteristics of a wheeled vehicle and can be used for measuring and adjusting the chassis geometry parameters including toe-in/toe-out, camber, caster, steering angles and plays, and the like.

The angles of convergence/divergence, so said <<toe-ins & toe-outs>> Of the car wheels, are defined as a non-zero angle of the pair of front (and/or rear) wheels with reference to the longitudinal axis of the vehicle. As a rule, the toe-in/toe-out angles of the wheels are taken to be equal. Due to this non-parallelism, while driving, the wheels are affected by the lateral forces. Moreover, in the case of toe-in, these forces would stabilize the motion, and in case toe-out—destabilize the move.

The toe-in/toe-out angle adjustment in the front and rear pairs of wheels of the car provides high stability during acceleration and high speed straight-line motion. In addition, when the vehicle tie rod are subject to constant load, all the undesirable steering plays are being eliminated from the driving system.

The camber is defined as a non-zero angle of the plane of rotation of the wheel about the vertical axis.

To stabilize the wheel about the vertical axis and the progressive change of the camber caused by steering wheels being misaligned, the pivot axis of steering wheels should be imparted a certain angle to the vertical axis of the chassis.

All the modern wheel suspensions in the vehicles are supplied with a sort of built-in angle controlling units making it possible to perform the adjustment.

PRIOR ART

Presently, the most commonly used apparatus dealing with chassis geometry parameters are the test-benches, based on the optically bound and installed outside the vehicle controlling &measuring tools comprising a certain source of light (eg, laser light emitter), a system of mirrors and screens supplied with measuring scales.

As an example, we refer to the optical test-bench, described in the patent No. 2034261 of Russia. Following the starting position requirements, the laser emitting source is to be installed at a strictly defined distance from the vehicle tested. The next step following the laser emitting source installation, is the laser beams calibration to lay them out parallel to each other and complanarily along with the horizontal site, the car wheels are touching.

After the installation is finished, it is necessary to calibrate the light rays so that the outgoing and the reflected beams coincide in a single line extending parallel to the site of the car wheels' disposition.

Then, one of the wheels is chosen to find a place on it to attach a mirror onto a mounting support, which enables to install the surface of the mirror parallel to the plane of rotation of the wheel.

If the pair of wheels are parallel to each other (toe-in is zero) and steadily keeps vertical position (camber is zero), it means that the beam having reflected from the mirror, gets back to the same point, from which it has come out. This dot, located on the screen as a zero point, reads the data of the corresponding measuring scales. If the wheel (and the mirror, mounted on it) is located neither in vertical nor in parallel position about the opposite wheel, the reflected beam will falls on the scale mark to indicate the angle inclination value.

As a rule, devices, equipped with externally mounted optical instruments, are considered to be reliable and long-lasting. However, being rather complicated and bulky to occupy a large production area and is not of high precision, since the measurement results are largely depend on the accuracy of the car placing on the rack between the emitters and the mirrors.

Also well-known is the apparatus for measuring and adjusting the chassis geometry parameters of the vehicles described in the U.S. Pat. No. 6,772,524 of the U.S.A., comprising a pair of optically matched tools placed in the inter-wheel space on an internal side of a circular element of a wheel. Each of these tools contains a device with a flat mirror and a laser emitter.

In this case, the laser emitter of one of the tools is intended to generate a light beam emission, while a flat mirror of another tool serves as a laser-beam target-reflector. Each tool includes a support, a means for fixing the support on the pin of the wheel and a bubble level on the horizontal axis, which is, during the tool installation on the pin of the wheel, obeyed to be perpendicular to the geometrical axis of its rotation.

The main part of the bubble level is a glass vial (usually tube-shaped) filled with alcohol or other sort of liquid so that only a small vapor <<bubble>> is left. The combination of vial with a measuring scale makes it possible to measure the deviation angles of the planes from horizontal position. In case of necessity to measure the deviation angles not only from the horizontal position, but also from the vertical one, an ampoule of a tubby bubble level should be used.

In accordance with the design of this patent, the circular element of the wheel plays the role of its pin. When installing the tools of the device onto the wheel pins, the emitter and the laser beam reflector (target) are facing each other in the line of sight. At the same time, the support and the optical device are rigidly connected to each other, for being enclosed in a single box, which is mounted on a cylindrical collar.

Thus, due to the tubular bubble level on the horizontal axis, the installation of both tools in a single horizontal laser beam emission and reflection plane is provided by rotating the tool about the axes of pins, and then, by tightening the clamp on the pin, the position of both tools is fixed.

Due to this placement of the tools, the laser beam being emitted from one of the optical devices meets with the mirror of another optical device, so that the angle between the planes of rotation of the wheels will be determined according to the position of the point of light on the scaled panel of the mirror.

This apparatus is quite simple, and it is compiled of only two optically coupled tools. It does not occupy production area, since both of them are designed for installation in the cross axle space of the car.

However, the design of the device confines the scope of its use—for cars only, for which the wheel removal is not a labour-intensive operation, and alloy pins have a defined diameter standard.

The tools of the apparatus have relatively large linear dimensions, since their width depends on the standard diameters of pins, and the length of them—on the dimensions structural elements of the front axle, admitting direct forwarding of the laser beam from the first tool emitting a laser beam to a second tool to be a target.

Besides, well-known is the apparatus for measuring and regulating the geometry parameters of the wheeled vehicle chassis, which is intended to be installed on the disk of the wheel in the interwheel space according to the patent number 184,004 of Israel. It comprises a support to be connected to the surfaces of the inner sides of the wheel disk of the vehicle, a tubular bubble level firmly mounted on the support and an adjustment tool rotatively mounted on the support. For the device is set up on the inner side of the wheel, particularly, on the disk of the wheel, the installation like this makes it possible to proceed measurement and adjustment works over the geometry parameters of all the wheeled vehicle chassis with no removing the wheels.

An additional advantage of this new invention is the independence of its parameters on the dimensions of elements of the chassis of the vehicle which let the device to be of small size and avoid the needs of providing special bulky means of test equipment.

However, that device is rather complicated because of the needs of the measuring and adjusting the toe-ins/toe-outs, camber and caster angle deviations from various adjusting positions on the wheel disk. It is unreliable in operation because of mandatory availability of a system of two tools.

DISCLOSURE OF THE INVENTION

The purpose of the present invention is to produce an apparatus for measuring and controlling parameters of the geometry of the chassis of a wheeled vehicle that contains only one tool, which allows a single mounting position on the wheel to measure all the undercarriage parameters of the car. Another object is to result the outer dimensions of the device up to the <<pocket>> format.

This will highly upgrade the reliability of the device and let the semi-skilled personnel, including the driver of the vehicle itself, to adjust the parameters of their vehicle chassis, on their own.

The goal herewith set up is being solved by means of accessories of the certain apparatus (aimed at measuring and controlling parameters of the geometry of the chassis of a vehicle), intended to be installed in its interwheel space and which comprises following components:
  a removable support designed to be mounted on the inner side of the wheel disk,
  a tubular bubble level, firmly mounted on the support, and
  an adjustment tool rotatively mounted on the support, the rotational fitting of the measuring and adjustment tool is made with the help of two hinge pairs, the first of which has a first hinge axis, and the first link, serving as a support for the device; the second hinge pair has a second hinge axis lying in the plane perpendicular to the first hinge pair; the second link of the first hinge pair is firmly attached to one of the links of the second hinge pair, while the said measuring tool is attached to the free link of the second hinge pair. As for the tool, it is made up of:
  a device showing the adjustment tool angle inclination about the terrestrial gravitational field,
  light line laser emitter,
  a rotatable means ensuring mechanical connection between the device, dedicated to the measuring of angular inclinations of the tool about the terrestrial gravitational field and the light line laser emitter, and
  a lock status, intended for fixing the rotating means into a position where the optical axis of the rotating laser line emitter lying through the plane, running at right angle to the second hinge axis.

The support looks like a flat oblong segment-looking bar with a transverse axis of symmetry, having a front surface for articulation with the hinged pairs, as well as the back plane for articulation with the planes of the inner side of the wheel disk.

By virtue of the current issue, that the term <<hinge axis>> and <<Shaft>> are equivalent, in the preferred embodiment the first hinge axis stands for a pin (a version of a shaft), which is designed for mating with an annular bearing, placed on the transverse axis of symmetry of the front surface of the support. As this take place, the pin is being retained in the sliding friction bearing by force of permanent magnets embedded in the butt of the pin and in the front surface of the support inside the ring-shaped bearing and oriented for attracting to one another.

The back side of the support has two contact surfaces, one of which is formed by the pair of stops, placed equally about the transverse axis of symmetry of the support; and the second one—by the pair of lamellar springs (placed equally about the same axis) to provide the force closure of the support with a pair of the stops above mentioned.

To prevent erroneous measurements and adjustments related to the procedures in the deformed parts of the first contact surface of the wheel disk, the following condition should be obeyed. On the front surface of the support, the center of the linear scale is to be placed at equal distances from its transverse axis of symmetry and parallel to the geometrical bubble level axis . . . and the light-emitting batt of the laser light point emitter, a loose end of which is mounted on the movable end of the spring-loaded rocker having a fixed swing point, lying on the back curface of the support at the point of intersection of the axis of symmetry and the geometrical axis of the pin.

To reveal of the deformed sections of the first contact surface of the wheel disk, the device is provided with an auxiliary bearing in which the light-emitting end of the laser light generator point is designed to interact with the linear scale of the first support, and a linear scale of the auxiliary support is designed to interact with the light-emitting end of laser light point emitter of the main support.

The link of the second hinged pair, which is rigidly attached by the measuring and adjustment tool, when rotating about the second hinge axis, is of an opportunity to take a variety of positions of planes, and the link of the second hinged pair, which is firmly attached to the link of the first hinged pair, when rotating about the first hinge axis, is able to take four stable positions in mutually perpendicular planes.

The most simple device for showing the angular inclinations of the tool about the terrestrial gravitational field is a tubby bubble level tube, geometrical axis of which is perpendicular to the optical axis of the light line laser emitter; as this takes place, the shaft of the rotative means being perpendicular to the plane passing through the second hinge axis, as well as to the plane of the laser emitter line transformation into a line of light and to the plane of rotation of the geometrical axis of the tubby bubble level, and carries a light line laser emitter and a disk with a tubby bubble level of the tool.

For more precise measuring the angular inclinations of the tool about the terrestrial gravitational field, there is an inclinometer available, informational outlets of which are connected to the inlets of a matrix digital indicator; as this takes place, the rotatable means has a shaft, one end of which is connected to the inclinometer and the other one is pivoted by the inlet wheel gearing the inclinometer with the light line laser emitter. The outlets of the inclinometer are cabled to the printer via computer.

For the measurement and regulation of caster, the light point laser emitter should be built into the said tool so that its optical axis would lie in the transformation plane of the rotative laser emitter and be parallel to the second hinge axis.

To measure the geometric parameters of the rear wheels of the vehicle, a modified version of the device is provided an adjusting tool of which comprises a device to measure angular inclinations of the tool about the terrestrial gravitational field, and a straight triangular prism, based on a right triangle of inequal catheti (legs). The free link of the hinge pair the prism is attached by its lateral facet, formed by the short cathetus oriented the way the ribs of the prism are perpendicular to the second hinge axis, while the device designed to measure the adjusting tool inclination about the terrestrial gravitational field, is firmly connected to the prism base. The straight triangular prism is based on a right triangle with the catheti correlation be equal to the averaged ratio of the front track of modern vehicles to their wheelbase.

The lateral facets of the prism comprise the linear scales, placed parallel to the bases of the prism, as this takes place, the photodiodes connected to a sound indicator are inserted into the zero points of these scales.

DESCRIPTION OF THE DRAWINGS

The description of our invention is illustrated by the following drawings, where:

FIGS. 7—3D view of the adjustment tool supplied with an inclinometer.

FIG. 9—an adjustment tool, a view from the laser emitter, facing the rear wheel of the car with matrix digital display (in the position "Close")

FIG. 10—a view of the adjustment tool with matrix digital display open for reading data.

FIG. 11—a conceptual sketch of interconnection among the electronic components of the device for displaying and leadout of the information.

FIG. 15—an installation chart of the full set of the devices for measuring and adjusting the wheeled vehicle chassis geometry.

PRESENTATION OF THE INVENTION EMBODIMENT

Figure 1:
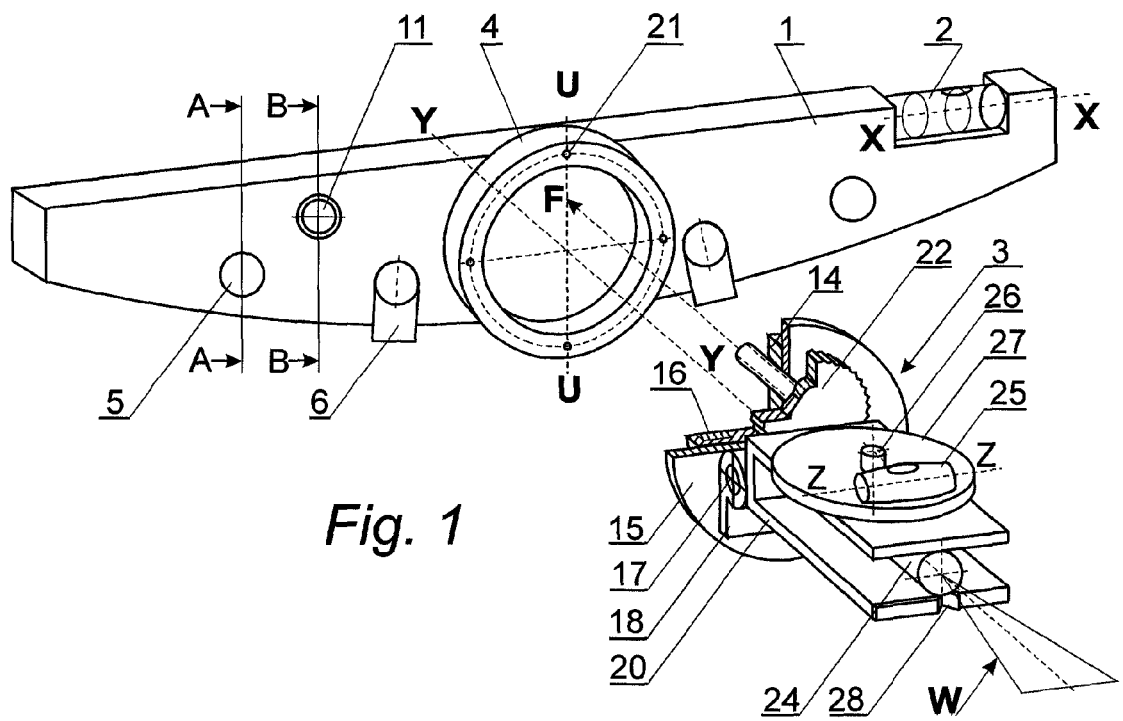
FIG. 1 shows a 3D view of the main embodiment version of the apparatus designed for measuring and controlling the geometry parameters of the vehicle chassis.

As shown in FIG. 1, a apparatus for measuring and controlling parameters of the geometry of the vehicle wheel chassis using its interwheel space comprises a support 1, intended to installation of the device inside the vehicle wheels, in particular, on its metal or plastic (or PVC) disk. On the support 1, there are: a rigidly fastened tubular bubble level 2 and a rotationally set up a measuring and adjusting tool 3.

The support 1 (FIG. 1) of the device is a flat oblong segment-looking bar with a transverse axis of symmetry U-U, having a plane front surface for articulation with hinge pairs, as well as the back side for the articulation with the surfaces of the inner side of the vehicle wheel disk.

The sliding friction bearing 4 is attached to the front plane of the support 1 so that its geometric axis Y-Y is perpendicular to the front surface of the support 1 and to the axis of symmetry U-U of the support.

Figure 3:
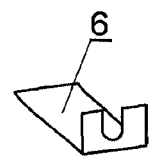
FIG. 3—leaf spring.

The back plane of the support 1 has three contact surfaces. As shown in section A-A (FIGS. 1 and 4), one of which C is defined by a pair stops 5, placed equidistantly about the transverse axis of symmetry U-U of the support 1. The second one D is flat and intended to contact with the plane of the rim wheel disk. The third one E is formed by the pair of leaf springs 6 (FIGS. 3 and 4) set equidistantly about the same axis of symmetry U-U to provide the force closure of the support 1 with a pair of the mentioned stops 5. The leaf springs 6 through their eyelets are attached to the front of the plane support 1 by the clamping grips 7.

Figure 5:
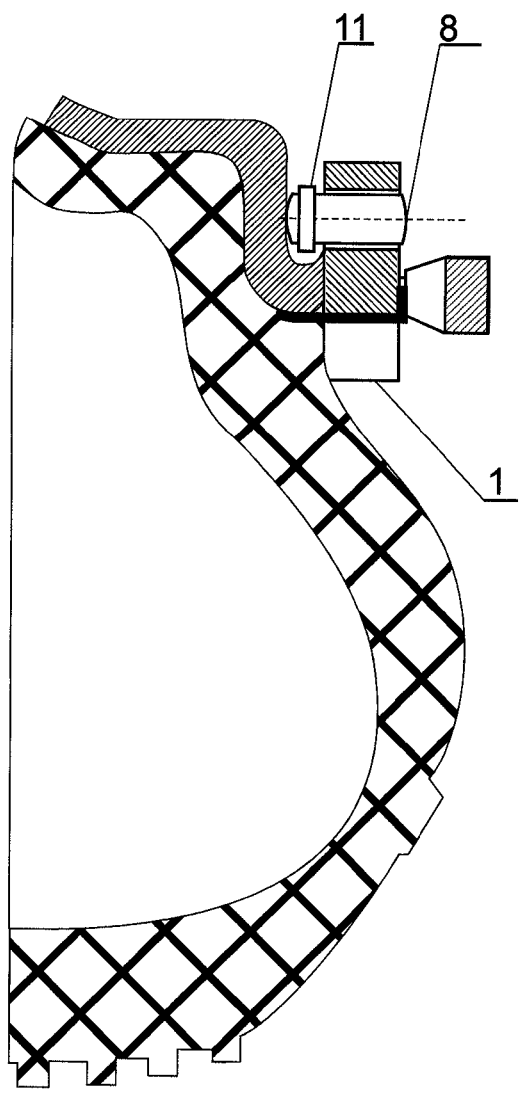
FIG. 5.—section B-B of the support, shown on the FIG. 1, showing the installation of this support by making use of the inner side of the car wheel disk plane lying behind the disk.

The FIG. 5 (section B-B FIG. 1) depictures an improved version of the support 1 to additionally provide a function of selecting for adjusting car chassis geometry of the undeformed area of the outside the plane of the rim wheel disk. This is achieved by virtue of scanning the disk surface, which lies behind the outer plane of the disk rim and less amenable to deformation when driving the car. For this purpose, the control light-emitting end laser generator 8 is installed on the support 1.

Figure 6:
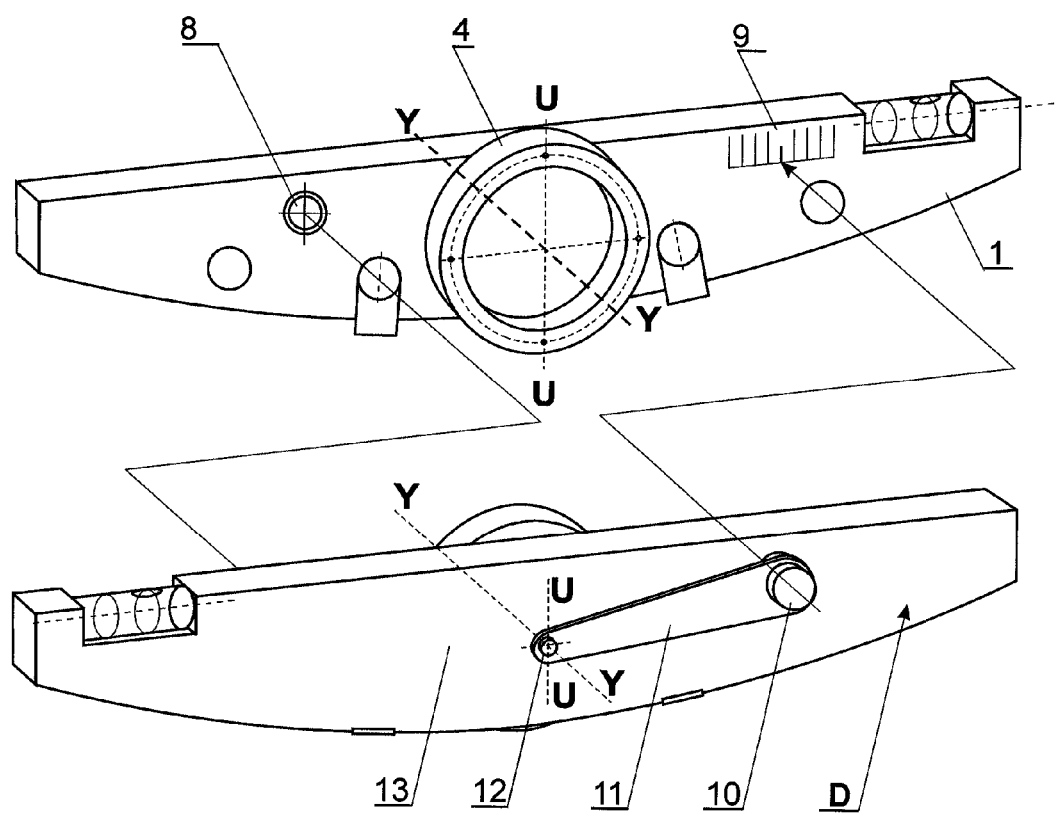
FIG. 6.—an installation chart of a couple of supports, shown in FIG. 5—for the sake of revealing deformation of the outer planes of the right and left wheel disks of the car.

As shown in FIG. 6, the light emitting end of the control laser light emitter 8 and the center of the linear scale 9 posted parallel to the geometric axis X-X of the tubular bubble level 2 are placed equidistantly about its transverse axis of symmetry U-U on the front side of the support. All the laser emitters, as well as the currently used in here, are of batch-production issuance (eg. German firm <<Stabilo>>).

Inoperable end 10 of the laser emitter 8 (FIGS. 5 and 6) is fastened on the movable end of the spring-loaded rocker arm 11 having a fixed swing point 12, which provides its permanent touch with the wheel disk plane lying behind the rim plane.

The swing point 12 lies on the flat surface D of the back side of the support 1 of the intersection of the axis of symmetry and the geometrical axis of the bearing 4.

If the parts of the right and the left wheels of the car selected for the regulating the geometry of the chassis procedure are not twisted, then, when employing of two apparatus with supports of this type (the main device with the support 1 and the auxiliary a like one 13 FIG. 6), the light point of the control laser emitter 8 of the first support 1 will get into the center of the linear scale (not shown in the drawing) of the auxiliary support 13, and the light point of the control laser emitter 8 of the auxiliary support 13 will get into the center of the linear scale 9 of the main support 1 of the main device.

Figure 2:
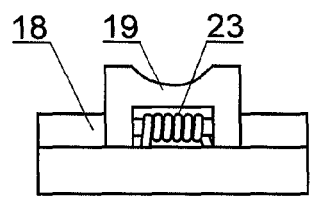
FIG. 2—the second hinge pair.

The rotational setting of the measuring and adjustment tool 3 on the support 1 is made with the help of two hinged pairs (FIG. 1 and 2), each of which has two links and a hinge axis.

The first pair of hinge has a first hinge axis, preferably fulfilled as a pin 14 with a geometric axis Y-Y. One of the links in the first hinged pair plays a role of the support 1 of the device, and the second one—of a flange 5 for the pin 14. The pin 14 is jointed with the support 1 with the help of the afore mentioned sliding friction bearing 4.

To additionally retain the tool 3 hanging on the bearing 4 in cantilever fashion, at least a couple of permanent mutually oriented magnets 16, are inserted into the butt of the pin 14 as well as into a bottom of the bearing 4.

The second hinge pair has a swivel hinge axis 17, perpendicular to the geometric axis Y-Y of the pin 14 parallel to the geometrical axis X-X of the tubular bubble level support 2.

The link 18 of the second hinge pair is firmly attached to the flange 15, and the link 19 of the same pair is firmly attached to the U-shaped cage body 20, on which the adjusting tool 3 is mounted.

To fix the tool 3 in the four stable positions, you can use clips of any known construction, such as ball retainers. Four of these ball-retainer 21 are equidistantly situated at the end of the bearing 4, and their opposite spherical hole-catchers are made at the end of the flange 15 (not shown).

The link 19 of the second hinged pair together with the of the U-shaped holding body 20, when rotating about the hinge axis 17, has an opportunity to provide a multiple variety of arbitrary planes. To this end, a set screw 22 with a knurled head is placed between the support 1 and the U-shaped holding body 20 of the tool 3, being the last link 19 of the second hinged pair attached. To fix the tool 3 in any position during the rotation around the axis 17, the body 20 under the action of the pressing of the hinge spring 23 (FIG. 2) is constantly pressed against the knurled set screw 22 head and, accordingly, the end of the set screw 20 is constantly pressed against the front plane of the supports 1 at point F.

The adjustment tool 3 comprises a device for taking the gauge of angle inclination of the very adjustment tool about the terrestrial gravitation field, a light line laser emitter 24, and a rotatable means ensuring mechanical connection between the device, dedicated to the measuring of angular inclinations of the tool about the terrestrial gravitational field and the light line laser emitter 24.

The most simple version of the device for taking the gauge of the tool 3 inclination about the terrestrial gravitational field is a tubby bubble level 25, the geometrical axis Z-Z of which is perpendicular to the optical axis of the laser emitter of light line 24; besides, a rotary means has a shaft 26, which is perpendicular to the plane passing through the second articulated axis 17, to the plane W of the laser emitter transformation laser beam into a light line and to the plane of rotation of the geometrical axis Z-Z of the tubby bubble level 25. The opposite inoperable end of the light line laser emitter 24 and the grooved disk 27 are dead-ended on the shaft 26 to turn it manually. Turning the shaft 26 provides the simultaneous pivot of the tubby bubble level 25 fastened on the surface of the disk 27, and the light line laser emitter 24.

The front butt end of the body 20 is attached by the wedge-shaped lock status 28, intended for locking the movable laser emitter 24, in the position, when its optical axis would lie in the plane perpendicular to the hinge axis 17. The optical axis of the laser emitter 24 being coaxial to the axis Y-Y of the pin 14 imitates the same position.

To obtain more accurate results in angular measurement to show the quality of the device intended to take the gauge of the adjustment tool angle inclination about the terrestrial gravitational field, the inclinometer 29 (FIG. 7) should be used. As this take place, the rotatable means has a shaft 30 which is loaded by the firmly attached inoperable end of the light line laser emitter 24 and a toothed wheel 31 of the gear drive. This transmission, on one hand, links the shaft 30 supplied with an inclinometer 29 (through the conic toothed wheels 32 and 33), and, on the other hand (through the toothed wheel 34), with the handle 35 of the worm gear for the turning the shaft manually. Turning the shaft 30 provides the simultaneous pivot of the inclinometer 29 and the light line laser emitter 24.

Figure 7:
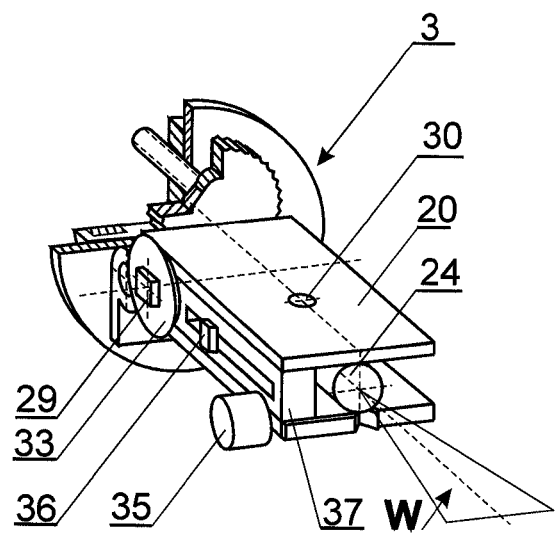

The laser emitters 8 and 24 commutation is provided by the slide switches 36 patterned after the switch shown in the FIG. 7. As plotted in FIG. 7, the switch 36 is installed in the raceway of the panel 37. Skipping along this raceway, the switch may fix three positions: one of them (the right one) cuts off the power supply; the second one (mid-position)—switches-on the laser emitter 8, and the third (the left one)—switches-on the laser emitter 24. In the drawings FIGS. 9 and 10 the panel 37 supplied with the switch 36 is conventionally removed.

The informational outlets of the inclinometer 29 (in the drawings not shown) are connected to the inputs of the matrix (e. g. LCD) digital indicator 38 (position <<Close>> in the FIG. 9; and for reading the data in position <<Open>>, as sown in FIG. 10). Under the digital indicator 38, there 30 is a control unit 39, comprising a board charged by a set of standard microcircuits to exert control over the inclinometer 29, digital indicator 38 and other electronic devices.

As plotted in FIG. 11, the informational outlets of the inclinometer 29 are also connected to the inputs of the computer memory bank 40. Also, the information inlet unit 41 outlets are connected to the same computer memory bank 40 inputs. The outlet informational collecting bar of the computer 40 is linked up to the printer 42 inputs.

For the measurement and regulation of the caster, the laser point beam 43 emitter is entered in the measurement and adjustment tool 3 (FIGS. 9 and 10). Being placed into a U-shaped cartridge 20, the laser emitter is oriented so that its laser light source is faced the rear wheel, while the optical axis of the laser emitter lies in the plane W of the rotatable laser emitter 24 beam transformation and is parallel to the second hinge axis 17.

Figure 12:
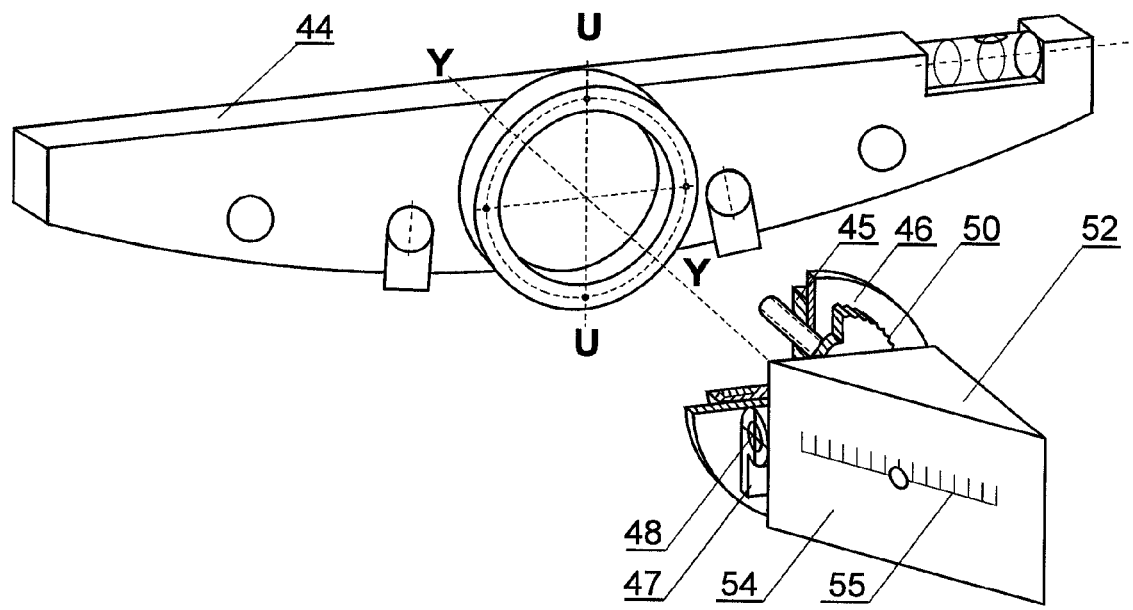
FIG. 12—a 3D view of the apparatus for measuring of the rear wheels chassis geometry.
Figure 13:
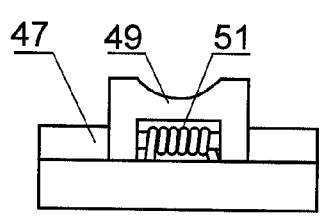
FIG. 13—the second hinge pair of the apparatus for measuring the, rear wheels chassis geometry.
Figure 14:
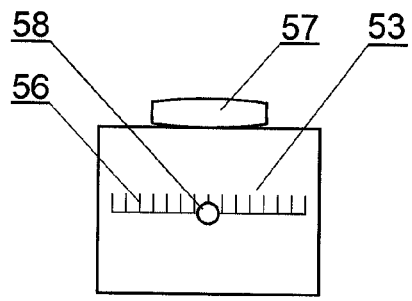
FIG. 14—the prism facet located at right angle to the hinge axis of the second hinge pair.

FIGS. 12, 13 and 14 shows a device modification designed to control and measure the car rear wheels geometry. This device comprises of two rotational pairs: the first one (a support 44, a pin 45 and a flange 46) and the second one (the first link 47, the hinged axle 48 and the second link 49). The set screw 50 is located between the second link 49 of the second rotational pair and the support 44.

By virtue of the stiffening joint of the first link 47 of the second hinged pair to the flange 46, the second link 49, being under the action of the loop spring 51 (FIG. 14), is permanently pressed by the set screw 50 to the front plane of the support 44. An adjusting tool comprises a straight trihedral prism 52, based on a right triangle formed by inequal catheti (legs), and a device to measure adjusting tool inclination about the terrestrial gravitational field.

The triangle catheti correlation is equal to 1:2 which is approximately equal to the averaged ratio of the most modern vehicles' front track to their wheelbase. A straight trihedral prism 52 stiffly jointed by its facet formed by a short cathet of the triangular base to the second link 49 of the hinge pair.

As this take place, on the facets 53 and 54 there are linear scales 55 and 56 are placed for the sake of interaction with the laser emitter 43. The photodiodes 57 connected to a sound indicator (not shown in the drawings) are inserted into the zero points of each the linear scale. The prism 52 is oriented about the link 49 so that its ribs are perpendicular to the second hinge axis 48, and the plane, on which the linear scales 55 and 56 lie, are parallel to this axis.

The prism 52 is made from aluminum, however, it may be produced from any other optically non-transparent material. A device to measure tool inclination about the terrestrial gravitational field, is produced in the form of a butty-looking bubble level 58, stiffly jointed to the top of the prism 52 so that its geometrical axis would be perpendicular to the hinge axis 48. The prism 52 may be fixed in two stable positions about the support 44 in which either perpendicular facet 53 or the sloping one 54 (FIG. 14) of the prism 52 may face the front wheels of the car.

For measuring and controlling parameters of the vehicle chassis geometry, for example, the car, it is set on the level of the ground garage elevator or observation wells or overpass, and then the steering wheel of the car is exposed in the <<straight ahead>> position (following the arrow G in FIG. 15) to be fixed in this position by any known method.

Figure 4:
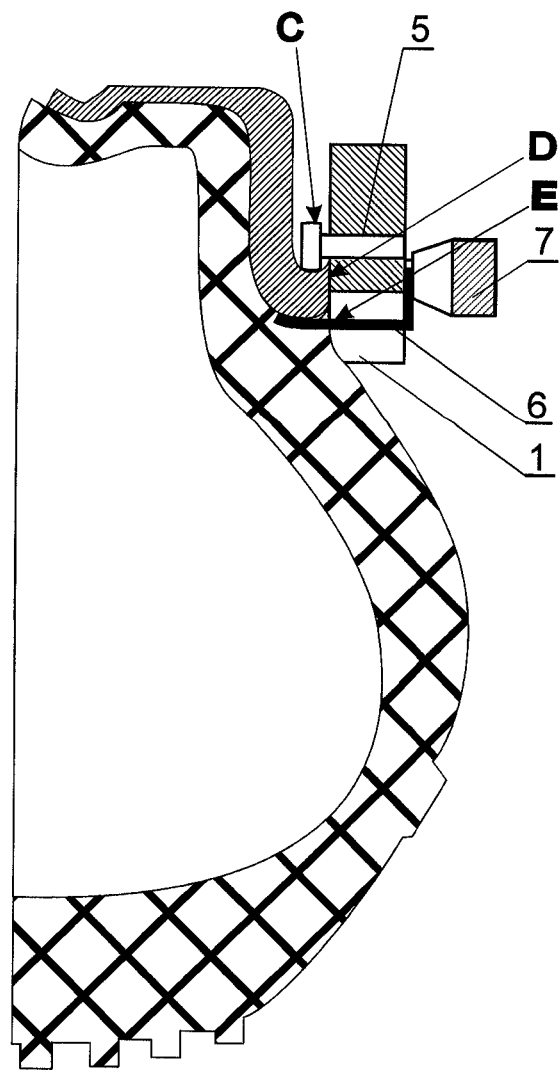
FIG. 4—displays a section A-A of the support shown on FIG. 1, showing the installation of the support onto the surface of the wheel disk inner side of the car.

For measuring and controlling parameters of the vehicle chassis geometry, for example, a car with the left-handed steering, the device is mounted on the inner side of the left wheel of the leading or driven axle at the bottom of the rim, as shown in FIG. 4.

For the toe-in/toe-out angle regulation of the car wheels with a right-handed steering, similarly, the device is firstly installed on the inside rim of the right wheel. To install the device on the rim of the wheel disk, the operator applies the support 1 with its back plane D to the outer plane of the wheel rim in the area of its lower point, and, as shown in section A-A, drops it on the stops 5, indicating the surface C of the support 1. Then he manually moves the support 1 in a circular position to the left or to the right until the gas bubble of the tubular level 2 gets the zero position. This position of the support 1 will fit a single location, regardless the angle of the wheel plane to the horizontal. With the handle 7, this position is retained by virtue of springs 6 (FIGS. 3 and 4), thus forming the third contact surface of the support E.

After fixing the support 1, a certain spot is found on the wheel rim where the adjusting tool 3 is started to be installed in the operating position. For this purpose the pin 14 together with the flange 15 and the first link 18 of the second hinge pair (FIG. 1) are turned about the axis Y-Y of the bearing 4, counteracting the force of mutual attraction of the permanent magnets 16. The pin 14 should have been being turned until the U-shaped holder of the cartridge 20 takes up a nearly horizontal position, which would be shortly notified by a click of retainers 21.

In order to bring the adjusting tool 3 in the horizontal position at more accurate mode, the shaft 26, on which the disc 27, the light line laser emitter 24 and the tubby bubble level 25 are fastened, should have been being turned until the geometrical axis Z-Z of the tubby bubble level 25 becomes perpendicular to the geometrical axis X-X of the tubular bubble level 2.

Then the knurled handle of the set screw 22 is manually turned to have it butted up against the point F of the front plane of the support 1, and then, under the action of the loop spring 22 (FIG. 2) the body 20 of the tool with the link 19 attached to it is to be turned about the hinge axis 17.

The U-shaped holder 20 is moved by the screw 22, having overcome the resistance of the loop spring 23, till the gas bubble of the tubby bubble level 25 takes a zero position. After that, the disk 27 is to be returned to the position in which the geometrical axis Z-Z of the tubby bubble level 25 becomes parallel to the geometric axis X-X of the bubble level 2, which would be shortly notified by a click of retainers 28. After that, using a marker, it takes to make a vertical scratch on the left wheel against the retainer 28 cavity, and transfer the apparatus up to the right wheel disk.

The same actions over this apparatus are to be performed on the right wheel as it was done on the left one. After the disk 27 returns into the position when the geometrical axis Z-Z of the bubble level 25 becomes parallel to the geometric axis X-X of the tubular bubble level 25, the body 20 is being turned by 90°, then a laser light emitter 24, in this case, generating the line into a vertical position, is switched on, and the right wheel is rotated until the vertical line of laser light emitter 24 becomes aligned with the vertical scratch, marked by a felt-tip pen on the left wheel tyre. This would mean that the planes of the left and the right wheels of the car are parallel. The same way the rear wheels of the car are subject to the adjustment.

To control the angle of the camber, the device is installed at the same location at the bottom of the inner side of one of the front wheels. To install the measurement and adjustment tool 3 in the operative position, the pin 14 with the flange 15 and the first link 18 of the second hinge pair are to be turned about the axis Y-Y in the bearing 4 until the U-shaped holder 20 takes a nearly horizontal position, which would be shortly notified by a click of retainers 21.

In order to bring the adjusting tool 3 in the horizontal plane at more accurate adjustment mode, the shaft 26, on which the disc 27, the laser light emitter 24 and the tubby bubble level 25 are fastened, should have been being turned into a position when the geometrical axis Z-Z of the bubble level 25 becomes perpendicular to the geometrical axis X-X of the tubular bubble level 2, and then the body 20 is being turned by 90°.

If the gas bubble of the bubble level 25 takes up a zero position, the plane of the wheel car is perpendicular to the horizontal garage elevator floor (and other devices). If the gas bubble of the bubble level 25 is shifted from the zero position, then the wheel of the car should have been being turned till the gas bubble takes the zero position (with tolerances, provided by the documentation of the manufacturer). For adjusting the camber of all the wheels of the vehicle, this procedure should be done for each of the wheels separately. The precision of wheel camber adjusting provided by the bubble level achieves up to 6 angular minutes.

Figure 8:
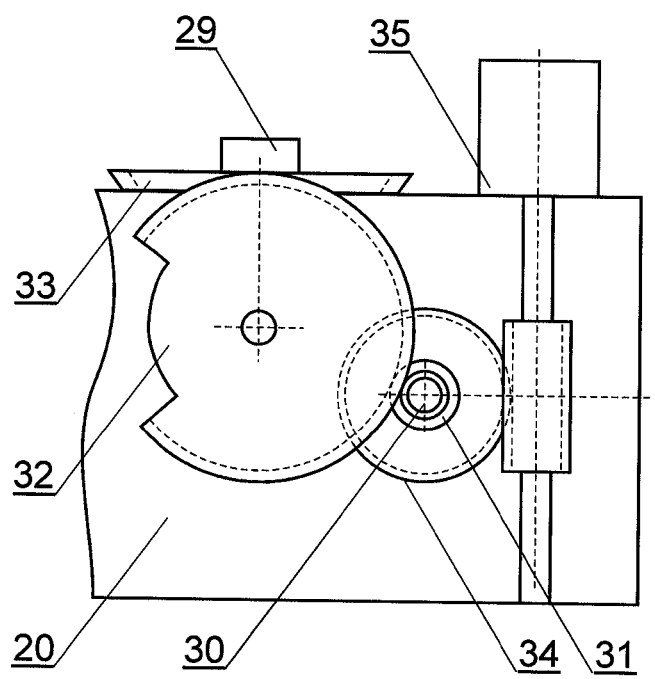
FIG. 8—a partly view from below on the adjustment tool from FIG. 7.

More accurate settings (detecting) of the camber is carried out by using of inclinometer 29 (FIG. 7 and 8) to provide the angle accuracy measurement up to 40" (angular seconds). To flash on the current angular position of the inclinometer 29 it takes to switch on the laser emitter 24 by shifting the slide switch 36 along the raceway on the board 37 from the right position to the mid-position. The next step is to open the laser emitter 39 lid supplied with the built-in LCD 38, where, after being processed in the control unit, the informational signals of the inclinometer 29 are displayed in alphanumeric information order.

After that the car wheel is to be positioned into a vertical plane by pivoting it until the camber data, of the range preliminary agreed upon with the manufacturer of the said car model, appear on the display. If the documentation of regulation works of the vehicle chassis geometry is necessary, the angular position sensor (inclinometer) 29 is to be connected (FIG. 11) to the memory device inputs of the personal computer 40 for storing the information concerning the chassis geometry parameters of the vehicle subject to adjustment.

The identification data about the vehicle and its owner is delivered to the same input blocks from the outlets of the information input blocks 35. The data subject to filing is delivered from the output of the computer 34 to the printer 36 for printing information on the paper bearer.

For measuring and regulation of the car steering unit caster, the device with the tool 3 is placed in the same point of the car left wheel rim (FIG. 4) with shortly adjusted toe-in/toe-out and the camber of the wheels. Then, on the horizontal platform, such as a garage elevator, a standard protractor is placed next to the wheel. The U-shaped tool body 3 clip 20 is pivoted at 90° so that the light beam laser emitter 43 would be sent down onto the protractor.

Then, the laser emitter 43 is switched on by moving the slide switch 36 in the leftmost position, and the left wheel is turned by a steering mechanism to 20° so that the beam point of the laser emitter 43 would be projected on the zero scratch of the protractor. In this case, the angular position sensor (inclinometer) 29 shows the degree value of the caster on its digital LCD display 38.

Then, by the steering mechanism the wheels are turned to the opposite direction, and by installing the tool 3 onto the right wheel, followed by performing of a set of similar operations, the right-hand digital LCD display 33 readings are taken on. The caster data should be considered to be truthful, if both readings are within the limits specified in the documentation of the car model manufacturer. Otherwise the steering mechanism is subject to regulation.

To simplify the car wheels toe-in/toe-out angles installation process, the operator can make use of additional device of the same model by carrying on the procedures over it identical to that for the main device on the base support 1. After the both laser light line emitters 24 of the car wheels are switched on, the lock-nut of the left-hand threaded sleeve should be released, then, by turning it left or right the laser emitter 24 light line is shifted until it coincides with the opposite laser emitter light line followed by locating the position of the left wheel with the help of a lock-nut of the left sleeve/Then the right-hand threaded coupling lock-nut is released and, by turning it left or right it takes to shift the line of light of the opposite laser generator till matching it with the light of the laser line emitter 24. After this, the right wheel position is fixed by right-hand threaded coupling lock-nut. The simplifying of the process is achieved by eliminating the marking of the lower points on the car tires and exception of the operation of the transfer of the device on the opposite wheel rim.

Also with the same pair of the main (on support 1) and the auxiliary (on support 13) devices, the identification of deformed sections of the contact surface of the wheel rim is carried out. For this purpose (FIGS. 5 and 6), a couple of the control monopole radiation laser emitters 8 mounted on the spring-yokes 11 (FIGS. 6 and 7) with fixed points of swaying 12 (FIG. 7) is switched to a pair of devices with combined light lines laser generators 24. If the selected section plane of the outer rim is not deformed, the optical axis of the control laser emitters 8 will be parallel to the optical axis Y-Y of the laser emitter 24 and, as shown in FIG. 6, the light points of the laser emitters 8 will get into the mid-points on the linear scales 9, situated equidistantly about the axis of symmetry U-U of the supports 1 and 13. If any of the points of light is not coincided with the center of one of the scales 9, the car wheel should be turned. As this takes place, the dead end 10 of the laser emitter 8 slides along the flat surface of the wheel disk, lying behind the rim plain. The pivot should be being performed aiming to get stopped by the undeformed section of the wheel rim plane, i.e. the area in which the light beam of the control laser emitter 8 will be parallel to the optical axis of the laser emitter 24 and will get into the center of the scale 9.

To simplify the procedure of measuring and controlling the geometry parameters of the rear wheels of the car (e.g. the left one), the device with a support 44 is being set onto the lower point of the rear wheel rim the way described above. Then the pin 45 with the flange 46 and the first link 47 of the second rotational pair are rotated (FIGS. 12, 13 and 14) so that the perpendicular side 53 of the prism 52 would be directed towards the respective front wheel.

To install the linear scales 55 and 56 and geometrical axis of the bubble level into horizontal position, the knurled handle of the set screw 50 is turned manually about the hinge axis 48 counteracting the loop spring 51 to pivot the second link 49 of the rotating pair and a prism 52 firmly connected with it.

After that, the slide switch 36 is being moved into the left position, at the same time switching on a laser point beam emitter 43 (FIGS. 9 and 10) and shooting the horizontal light beam towards perpendicular facet 53 of the prism 52. When the rear wheel properly installed the beam should be projected on the scale 56 of the side 53 of the prism 52.

If the beam is projected onto the mid-point (zero point) of the scale, in which the photodiode 57 is built-in, a buzzer of the signaling device will shortly ring out. If the beam will fail to get onto the scale (neither above, nor below), then the toe-in/toe-out of the wheel is to be adjusted. If the beam will mark off within the range of the scale in the wrong point, the wheel toe-in/toe-out adjusting should be processed until the beam shows up by the given mid-point on the scale 48. The similar procedures of measuring and controlling the geometry parameters should be performed for the right rear wheel as well.

To control the correctness of the chassis geometry adjustment, it is additionally recommended to check the chassis diagonals. For this purpose the prism-looking measurement and adjustment tool 52 mounted, for example, on the right rear wheel disk, is being turned into the second stable position, so that the beveled side 54 (FIG. 15) of the prism would be facing the left front-wheel vehicle (FIG. 13).

The adjusting tool 3 is fixed by the retainer 21 and the flange 5 along with the adjusting tool 3 is turned to 90° to let the laser emitter 24 change for vertical light line shooting. To obtain a vertical light line on the scale 56 of the prism 52 on the right rear wheel, the shaft 30 of the laser emitter 24 should be turned manually by spinning the knurled handle 35 through the worm transmission of the wheels 34 and 31.

Coincidentally with the pivoting of the shaft 30 through the conic toothed wheels 32 and 33, the inclinometer 29 is turning to indicate the data on the screen of the LCD 38. If, as this takes place, both of measurements will give the same result, the diagonals should be considered equal, and all four wheels of the car—are to lie at the vertices of a parallelogram.

The tools of this device may be easily installed on the inner wheel rim of almost any vehicle, trailer, wheel tractor, airplane, or other wheeled vehicle. Therefore, this device is universal. It is also portable, since its dimensions are not dictated by the design of the car chassis, and depend on the ergonomic properties only.

The device tool kit for measuring the car chassis geometry with all the concomitant accessories may be stored in the pouch <<pocket>> size. With this device one can to measure and control the chassis geometry parameters of the vehicle with sufficient accuracy using only the observation pits or garage lift with no special storage or testbench.

REFERENCES

1. V. B. Lamonov and V. K. Rybakov. Optical bench for the control of steered wheels of the vehicle. Russian Patent No 2034261. Appl. 1991.10.30. publ. Apr. 30, 1995 Int. Cl.:GO 1M 17/06.

2. P. Machek. Chassis Alignment system. U.S. Pat. No. 6,772,524. Filed Sep. 13, 2002. publ. Aug. 10, 2004. Int. Cl.:GOlb 11/275.

3. M. Lokshyn. Apparatus for measuring and adjusting chassis geometry of a motor vehicle. Patent of Israel No 184004. Filed Jun. 18, 2007. Publ. Sept. 24, 2009. Int. Cl.: GO1M 17/06.

The invention claimed is:

1. The DEVICE FOR MEASURING AND ADJUSTING the geometry parameters of the wheeled vehicle chassis, designed to be mounted within the interwheel space on the wheel disk, comprising
   a removable support designed to be mounted on the inner side of the wheel disk,
   a tubular bubble level firmly mounted on the support,
   an adjustment tool rotatively mounted on the support, wherein the rotational joint of the of the adjustment tool is made with the help of two hinge pairs, first of which has a first hinge axis and a first link serving as a support of the device, and the second hinge pair has a second hinge axis lying in the plane to be perpendicular to the first hinge axis; the second link of the first articulated pair is rigid mounted to one of the links of the second hinge pair, and the free link of the second hinge pair is firmly attached to the abovementioned adjustment tool comprising
   a device showing the adjustment tool angle inclination about the terrestrial gravitational field,
   laser light line emitter,
   a rotatable means ensuring mechanical connection between the device, dedicated to the measuring of angular inclinations of the tool about the terrestrial gravitational field and the laser light line emitter, and
   a lock status, intended for fixing the rotating means into a position where the optical axis of the laser light line emitter lying through the plane, running at right angle to the second hinge axis.

2. The device of claim 1, wherein the support looks like a flat oblong segment-looking bar with a transverse axis of symmetry, having a plane front side for articulation with the hinged pairs, as well as the back side for articulation with the surfaces of the inner side of the wheel disk.

3. The device of claim 2, wherein the first hinge axis stands for a pin, which is designed for mating with a annular bearing, placed on the transverse axis of symmetry of the plane front surface of the support, moreover the pin is being retained in the annular bearing by force of permanent magnets embedded in the butt of the pin and in the plane of the support inside the ring-shaped bearing and oriented for attracting to one another.

4. The device of claim 2, wherein the back side of the support has three contact surfaces, one of which is formed by the pair of stops, placed equidistantly about the transverse axis of symmetry of the support; the second one is plane and designed to get in touch with the plane of the wheel rim, and the third one is represented by the pair of lamellar springs placed equidistantly about the transverse axis to forcefully provide the closure of the support with a pair of the stops above mentioned.

5. The device of claim 2, wherein the center of the linear scale being parallel to the geometrical tubular bubble level axis and the light-emitting end of the laser light point emitter, a loose end of which is mounted on the movable end of the spring-loaded rocker having a fixed swing point, lying on the back surface of the support at the point of intersection of the axis of symmetry and the geometrical axis of the pin, are to be placed on the plane of the support equidistantly about its transverse axis of symmetry.

6. The device of claim 5, wherein the he is provided with an second support in which the light-emitting end of the laser light point generator is designed to interact with the linear scale of the first support, and a linear scale of the second support is designed to interact with the light-emitting end of laser light point emitter of the first support.

7. The device of claim 1, wherein the link of the second hinged pair, which is firmly attached by the adjusting tool has an opportunity to rotatively provide a multistational variety of arbitrary planes, and the link of the second hinged pair, which is firmly attached to the link of the first hinged pair, when rotating about the first hinge axis, is able to take four stable positions in mutually perpendicular planes.

8. The device of claim 1, wherein device, showing the angular inclinations of the tool about the terrestrial gravitational field, is a tubby bubble level, geometrical axis of which is perpendicular to the optical axis of the light beam laser emitter; as this takes place, the shaft of the rotative means being perpendicular to the plane passing through the second hinge axis, as well as to the plane of the laser emitter beam transformation into a line of light and to the plane of rotation of the geometrical axis of the tubby bubble level, and carries a light line laser emitter and a disk with a tubby bubble level.

9. The device of claim 1, wherein the device, showing the angular inclinations of the tool about the terrestrial gravitational field, is an inclinometer, informational outlets of which are connected to the inlets of a matrix digital indicator; as this takes place, the rotatable means has a shaft, one end of which is connected to the inclinometer and the other one is pivoted by the inlet wheel gearing the inclinometer with the light line laser emitter.

10. The device of claim 9, wherein the outlets of the inclinometer are cabled to the printer via computer.

11. The device of claim 1, wherein a light beam laser emitter is firmly mounted into the said tool the way its optical axis lays in the transformation plane of the laser light line emitter and is parallel to the second hinge axis.

12. The device of claim 1, wherein the adjusting tool comprises a device to measure adjusting tool inclination about the terrestrial gravitational field, and a straight triangular prism, based on a right triangle of assertive catheti (legs); as this takes place, the free link of the hinge pair the prism is attached by its lateral facet, formed by the short cathetus oriented the way the ribs of the prism are perpendicular to the second hinge axis, while the device designed to measure the adjusting tool inclination about the terrestrial gravitational field, is firmly connected to the prism base.

13. The device of claim 12, wherein the straight triangular prism is based on a right triangle with the catheti correlation be equal to the averaged ratio of the front track of modern vehicles to their wheelbase.

14. The device of claim 12, wherein the lateral facets of the prism comprise the linear scales, placed parallel to the bases of the prism, as this takes place, the photodiodes connected to a sound indicator are inserted into the zero points of these scales.

* * * * *